Figure 6:
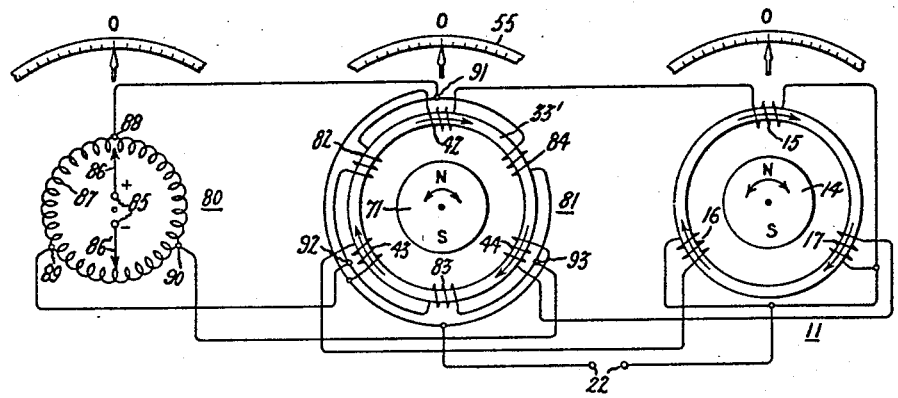

Nov. 20, 1945. H. D. MIDDEL 2,389,449
TOTALIZING TELEMETERING SYSTEMS
Filed Jan. 2, 1943 3 Sheets-Sheet 1
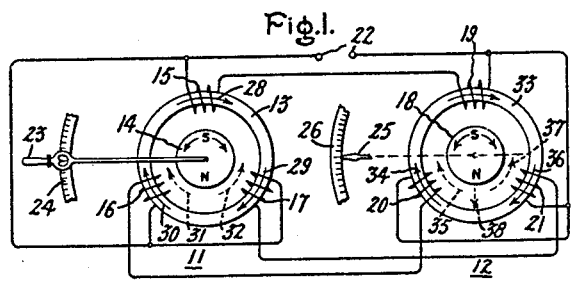
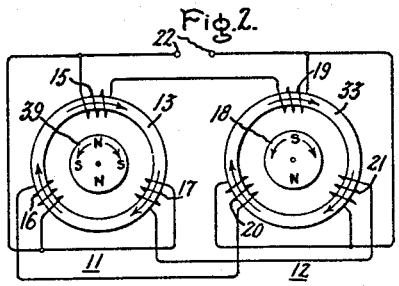
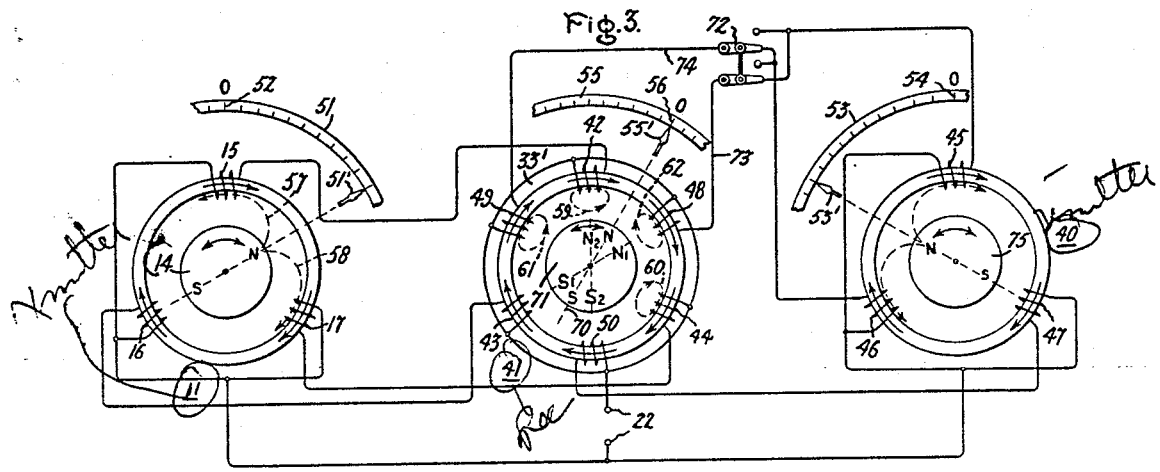
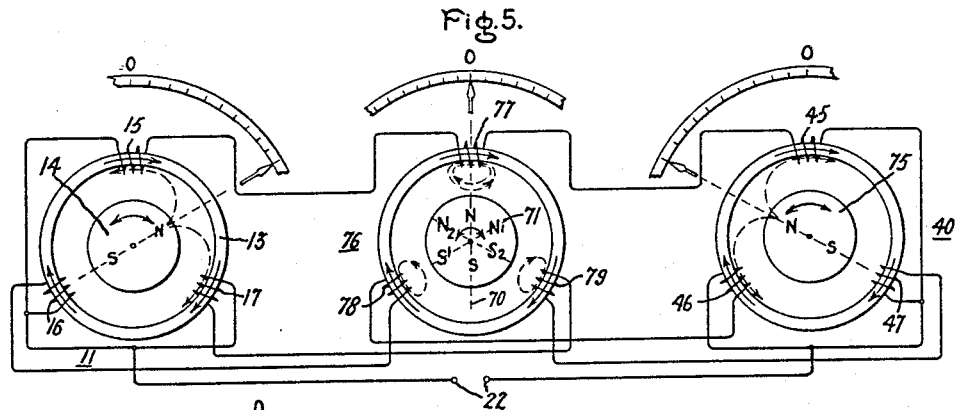
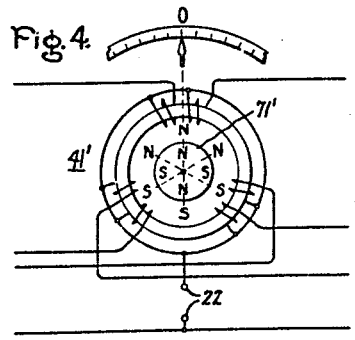
Inventor:
Hendrik D. Middel,
by Harry E. Dunham
His Attorney.

Inventor:
Hendrik D. Middel,
by Harry E. Dunham
His Attorney.

Nov. 20, 1945.    H. D. MIDDEL    2,389,449
TOTALIZING TELEMETERING SYSTEMS
Filed Jan. 2, 1943    3 Sheets-Sheet 3
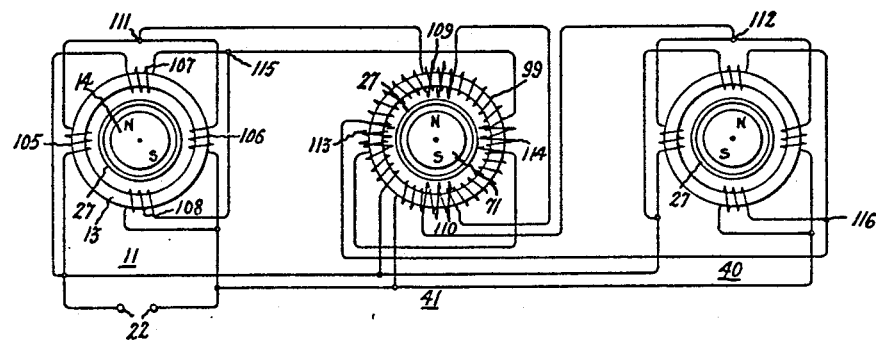
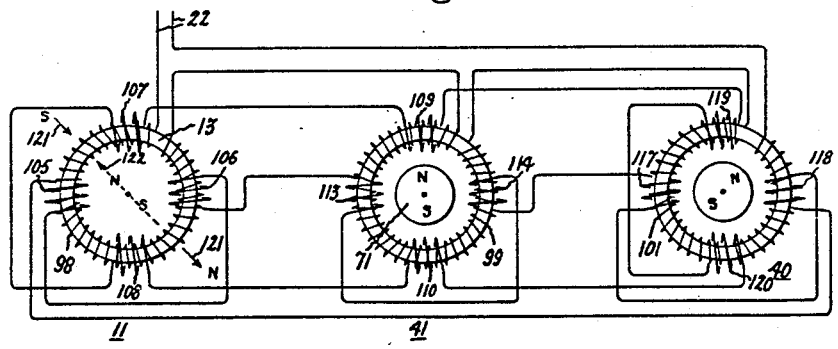
Inventor:
Hendrik D. Middel,
by Harry E. Dunham
His Attorney.

Patented Nov. 20, 1945

2,389,449

UNITED STATES PATENT OFFICE 2,389,449

TOTALIZING TELEMETERING SYSTEM

Hendrik D. Middel, Schenectady, N. Y., assignor to General Electric Company, a corporation of New York Application January 2, 1943, Serial No. 471,120

2 Claims. (Cl. 177—351)

This application is a continuation-in-part of my copending application, Serial No. 441,451, filed May 2, 1942, and Serial No. 461,710, filed October 12, 1942.

My invention relates to electromagnetic devices and concerns particularly differential, totalizing and average value indicators.

My invention has for its object the provision of methods and apparatus for indication of values of measured quantities, for indication of angular positions or positions along a straight line, for indication of the direction of the earth's magnetic field, for transmission of angular and rectilinear motions, for multiplication and division of angular motion, for indicating the difference between two values and for indicating either the algebraic sum or the average of a plurality of values.

Other and further objects and advantages will become apparent as the description proceeds.

In carrying out my invention in its preferred form I provide a magnetic core, preferably one providing a substantially continuous or closed magnetic circuit, alternating current exciting windings consisting of one or more coils linking the magnetic core, arrangements for superimposing unidirectional magnetic flux in the magnetic core, which unidirectional flux is adjustable in angular direction for varying the saturation effects in the core, and an indicator or other responsive device which is affected by variations in the saturation condition of the core. The responsive device may be such as to respond directly to second harmonics produced in the magnetic core flux by unsymmetrical saturation or polarization of the core. Alternatively, I may provide a responsive device or indicator which includes a second magnetic core provided with windings interconnected with windings on the first core whereby the responsive device responds electromagnetically to variations in saturation effects in the first core which are reproduced in the core of the responsive device.

In a preferred form of my invention for simple remote indication of an angular position, similar transmitting and receiving elements may be provided having rotatable magnets or rotors and stationary saturable ring cores wound with alternating current windings with interconnections between the windings at the transmitter and the receiver. The superimposing of unidirectional flux on A.-C. flux in a saturable core gives rise to second and also higher even harmonics and conversely the injection of second harmonics in a saturable core carrying fundamental frequency flux produces a unidirectional magnetization effect. Consequently, one rotor tends to follow the other, when the latter is turned.

In totalizing and differential indicating systems I provide two or more transmitters and a receiving unit with windings connected to the transmitting windings for combining the effects produced by the transmitting windings.

A better understanding of the invention will be afforded by the following detailed description considered in connection with the accompanying drawings, and those features of the invention which are believed to be novel and patentable will be pointed out in the claims appended hereto.

Figure 7:
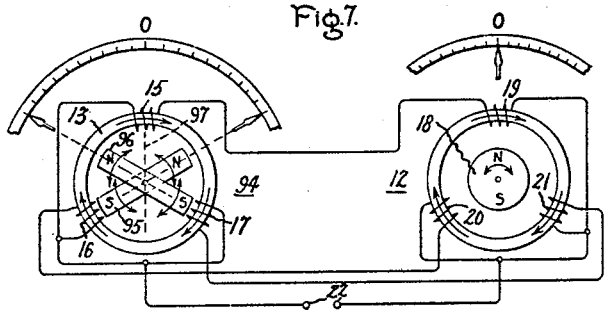
Figure 8:
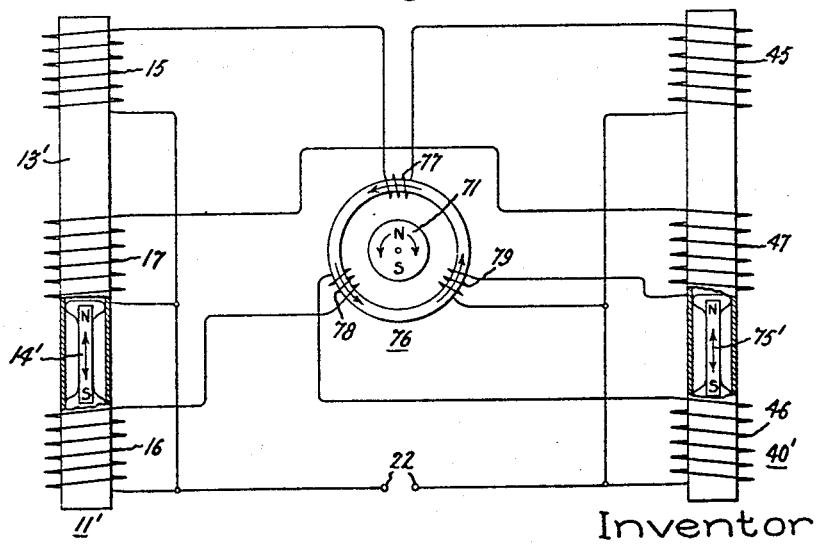

In the drawings Fig. 1 is a schematic diagram showing the electric circuit arrangement of an alternating-current remote position indicator which operates without brushes, slip rings or rectifiers; Fig. 2 is a schematic diagram of another form of alternating-current remote position indicator with angular multiplication or division; Fig. 3 is a schematic diagram of a differential, totalizing or average position-indicating system in which there is a division of the resultant value; Fig. 4 is a schematic diagram of a modification of the arrangement of Fig. 3 to provide still further division of the indication; Fig. 5 is a schematic diagram of a modification of the arrangement of Fig. 3; Fig. 6 is a schematic diagram of a system for combining the indications of direct-current and alternating-current remote indicating systems; Fig. 7 is a schematic diagram of a modified remote indicating system employing a dual or multiple transmitter for combining two or more indications; Fig. 8 is a schematic diagram of a modified arrangement for combining rectilinear indications from a plurality of transmitters or for combining rectilinear and angular indications; Fig. 9 is a schematic diagram of an arrangement employing modified connections for excitation and interconnection of elements; and Fig. 10 is a schematic diagram illustrating still another method of interconnection of elements. Like reference characters are utilized throughout the drawings to designate like parts.

Electromagnetic units may be utilized to form both the transmitter and receiver elements of a single-phase alternating current telemetering system requiring no brushes or moving contacts, no toothed or salient pole elements, no phase splitters, and no rectifiers and having no direct current circuit if permanent magnets are utilized for polarization as illustrated in Fig. 1. In this case single-phase alternating current is utilized for excitation of both the transmitter and receiver cores and even components of current or voltage induced by the polarization produced by the permanent magnet rotors are utilized for causing requisite interaction between a transmitter 11 and a receiver 12 to bring the transmitter and receiver rotors into corresponding positions. Either element 11 or 12 may serve as transmitter or receiver according to which one is driven and which one is left free to rotate in response to the other.

Where angular positions are to be indicated throughout a full 360 degree circle the arrangement of Fig. 1 may be employed having two or more exciting coils on both the transmitter and receiver cores with electrical interaction between corresponding exciting coils of the transmitter and the receiver. As shown in Fig. 1 the transmitter 11 comprises a core 13 composed of permeable magnetic material, a permanent magnet rotor 14 composed of high coercive force magnetic material, and an excitation winding consisting of a plurality of excitation coils 15, 16 and 17 shown as three in number. To correspond to the transmitter 11, the receiver 12 has a core 33, a rotor 18 and excitation coils 19, 20 and 21 corresponding to the transmitter elements 13, 14, 15, 16, and 17, respectively. Corresponding coils of the transmitter and receiver are connected in series as shown to a source of alternating excitation current 22. The frequency of the alternating current source 22 may be of any value suited to the electrical dimensions of the coils, and I have found that satisfactory results are obtained by using frequencies from the usual commercial frequencies such as 60 cycles to the higher audio frequencies such as 400 to 800 cycles per second.

For convenience the transmitter 11 is shown as having an operating handle 23 connected to the rotor 14 and cooperating with a 360 degree fragmentarily represented scale 24 and the receiver 12 is shown as having a pointer 25 connected to the rotor 18 and cooperating with a fragmentarily shown scale 26. However, the transmitter and receiver are in fact interchangeable and if the transmitter rotor 14 is mounted in a suitable low friction suspension it may be caused to rotate by rotation of the receiver rotor 18.

To simplify the drawings no damping rings are shown. However, pointer oscillation may in some cases be minimized in the arrangement of Fig. 1 as well as in the modified arrangements to be described by employing damping elements 27 such as shown conventionally in Fig. 9. The direction of rotation of the receiver with respect to the transmitter may be reversed by interchanging any two of the three similar leads between transmitter and receiver coils.

Referring to Fig. 1 it will be observed that with the transmitter rotor 14 in the position shown the flux of the rotor has balanced effects on the excitation coil 15 but has opposite effects on the coils 16 and 17. At a given instant the polarity of the flux in the core 13 produced by the excitation coils is represented by the full line arrows 28, 29 and 30, respectively, all flowing in the same peripheral direction. The unidirectional flux of the rotor 14 flows along a vertical diameter across the core 13 and divides in the periphery of the core 13 along two paths represented by the dotted arrow 31 at the side of the coil 16 and the dotted arrow 32 at the side of coil 17. It will be observed that at this instant, during the half cycle assumed, the fluxes 31 and 30 in the coil 16 are additive, whereas the fluxes 29 and 32 in the coil 17 are in opposition. For this reason the portion of the core within the coil 16 is saturated causing the reactance of this coil to fall to a minimum, thus causing relatively large current to flow in the receiver coil 20. Similarly the portion of the core within the coil 17 is desaturated causing its reactance to rise to a maximum and permitting relatively little current to flow in the receiver coil 21. The existence of the permanent magnet 18 will be disregarded for the moment. The resultant effect is that during that half cycle, a rather large flux flows in the left-hand side of the receiver core 33, equaling the sum of the flux represented by a solid line arrow 34 denoting the normal instantaneous flux of the A.-C. coil 20 plus the flux represented by the dotted arrow 35 representing the increase produced by the excess current flowing in the coil 20.

The resultant flux on the right-hand side of the receiver core 33 may be represented by the difference between the full line arrow 36 and the opposing dotted line arrow 37 denoting respectively the flux which would normally be produced by the A.-C. coil 21 and diminution caused by the reduction in current in the coil 21. Owing to the inequality in the peripheral fluxes on the left-hand and right-hand sides of the core 33 a unidirectional leakage flux must flow. Its direction at the center of the core 33 will be diagonally downward and toward the right. During the next half cycle the polarities of the instantaneous fluxes produced by the alternating current excitation coils are reversed, the receiver coil 21 now carries the excess current, the receiver coil 20 now carries less than normal current, and a unidirectional leakage flux flowing diagonally downward is again produced. However, in this case the leakage flux flows diagonally downward toward the left. The resultant effect of these two alternately produced leakage fluxes is as if there were a diametrical flux flowing vertically downward as represented by the dotted arrow 38. The polarizing effect of the rotor 14 of the transmitter 11 on the transmitter core 13 and the excitation coils is therefore such as to produce in effect a corresponding unidirectional flux along a diameter of the receiver core 33 corresponding in direction to the direction of polarization of the transmitter rotor 14. Consequently, the receiver rotor 18 takes a position in which its line of polarization follows the dotted arrow 38 and the receiver rotor 18 comes into alignment with the transmitter rotor. If the receiver rotor 18 is also a magnet as described, both coils in any pair operating across the alternating-current source, such as the coils 16 and 20, have their inductances raised and lowered at the same time, causing approximately twice the inductance changes that would be produced if only one of the two rotors were a permanent magnet.

The action may also be explained in terms of the generation and transfer of superposed second harmonics, which are the equivalent of unidirectional M. M. F. acting diametrically across a ring core.

If the transmitter rotor 14 is rotated clockwise a small number of degrees from the position shown, the action upon the excitation coils 16 and 20 will be diminished and some action will be produced in the excitation coils 15 and 19. The effective resultant line of diametrical polarization in the receiver represented by the dotted arrow 38 will consequently change in angular direction so as to follow the transmitter rotor. If the transmitter rotor is rotated 60 degrees clockwise from the position shown, the transmitter coil 16 will of course become the one in which polarization effects are neutralized and all of the action will take place in the transmitter coils 15 and 17 and the receiver coils 19 and 21. The apparent or effective resultant line of polarization of the receiver rotor 18 will then intersect the mid point or balance point of the receiver coil 20. Thus the receiver rotor is caused to follow the transmitter rotor progressively. There is only one synchronous position for the system. That is, for each position of the transmitter, there is only one position of the receiver in which it remains.

Although in Fig. 1 I have illustrated a telemetering or remote position indicating system in which the transmitter and the receiver are intended to rotate in unison, it will be understood that my invention is not limited to this specific arrangement and does not exclude position indicating systems and rotation transmitting systems in which the transmitter and the receiver do not rotate in unison. The receiver scale distribution may be made different from that of the transmitter by shifting one or more of the transmitter or receiver coils with respect to the others so that the coil distribution is different on the receiver from that on the transmitter. Furthermore, the ratio between the angle of rotation at the transmitter and the receiver may be given some value other than unity. For example, a ratio of 2:1 or 1:2 according to which element is made the transmitter and which the receiver may be obtained by the arrangement illustrated in Fig. 2 by having a ratio between the number of excitation coils and rotor poles in one element different from the ratio in the other, or a different ratio between the number of internal connections to the excitation winding and the number of rotor poles. In Fig. 1, for example, there are three field coils on each core, or six internal connections to the aggregate excitation winding on a core which are in circuit with the winding on the other core, and the rotors are bipolar. In Fig. 2 I have shown one element 12 with a bipolar rotor 18 and the other element 11 with a four-pole rotor 39. The stator cores 13 and 33 and their excitation windings are the same as in Fig. 1. With the rotor 39 in the position shown in Fig. 2 it will be observed that the effect on the excitation coils 15, 16 and 17 is the same as in Fig. 1; that is, the effect on the coil 15 is neutralized and the portions of the core under the portions 16 and 17 are oppositely and equally polarized by the rotor 39. However, since there are twice as many poles on the rotor 39 as on the rotor 14 of Fig. 1, the reversals in polarity of the polarizing effect of the rotor 39 of Fig. 2 will occur twice as often for each rotation of the rotor 39, and the rotor 18 of the receiver will rotate at twice the angular velocity of the rotor 39. Conversely, if the rotor 18 is driven, the rotor 39 will deflect one-half as much. Looked at another way, since the angular spacing between poles of the rotor 39 is half as great as in the case of the rotor 14 of Fig. 1, the rotor 39 need rotate only half as far to produce the same effect on the variation in relative effects in the excitation coils and consequently need rotate only half as far to produce a given rotation of the receiver rotor 18. As will be explained hereinafter division of receiver movement may also be obtained by providing additional units such as 11 and 12.

I have devised arrangements combining units of the type hereinbefore described in which a single receiver unit may be employed with a plurality of transmitter units to indicate the resultant value of indications transmitted by the transmitter units. Depending upon the connections employed, the deflection of such a receiver is proportional to the sum of the transmitter deflections or the difference between two transmitter deflections.

A telemetering system analogous to that shown in Fig. 1 may be employed for producing an indication of the average angular position of two transmitter rotors. For example, as illustrated in Fig. 3 there is a first transmitter unit 11 shown as identical with the unit 11 shown in Fig. 1 and a second transmitter 40 identical with the unit 11. A modified form of receiver 41 is provided. The unit 41 is similar to the units 11 and 40 in construction and principle of operation except that it has duplicate sets of exciting windings corresponding to the windings 15, 16 and 17 of the transmitter unit 11.

The receiver 41 is provided with windings 42, 43 and 44 which are connected in series with the windings 15, 16 and 17, respectively, across the supply terminals 22 providing a source of single phase alternating current. The second transmitter 40 has exciting windings 45, 46 and 47 corresponding to the windings 15, 16 and 17, respectively, of the unit 11. Corresponding to these windings the receiver 41 is provided with windings 48, 49 and 50 connected in series with the windings 45, 46 and 47 respectively across the supply terminals 22. For convenience in explanation and clarity in the drawings the receiver windings 42 and 48 connected to corresponding windings 15 and 45 (like other pairs of windings) have been shown as angularly displaced although they could have been wound together using double conductor wire so as to make the arrangement like that of the transmitter units 11 and 40.

The system shown is suitable for indications throughout the full periphery of 360 degrees and any number of revolutions of the rotors may be made in either direction. To simplify the drawings the scales are shown only in fragmentary form. The transmitter 11 is shown with a scale 51. For the sake of reference, the scale 51 is shown with an arbitrarily selected zero position at the upper end of the vertical diameter intersecting the point 52 of the scale. Similarly the transmitter unit 40 has a fragmentarily shown scale 53 with an arbitrarily selected zero division at the vertical point 54. The receiver scale 55, however, is shown with an arbitrarily selected zero position angularly displaced to the point 56. The units 11, 40, and 41 have pointers 51', 53' and 55' carried by the rotors 14, 75 and 71, respectively, and arbitrarily represented as being at the "north" ends of the respective rotor lines of magnetization.

The manner in which the system of Fig. 3 operates will readily be perceived by considering the principle of operation of the system of Fig. 1. If it is assumed that the coils of the second transmitter 40 are disconnected the receiver 41 will follow the indications represented by rotation of the rotor 14 of the transmitter unit 11. If the coils of the first transmitter 11 are disconnected and those of the second transmitter 40 are connected, the receiver 41 will follow the indications represented by the rotor 75 of the transmitter unit except for an angular displacement corresponding to the angular displacement of the coils 48, 49 and 50 from the positions of the coils 75, 16 and 17, respectively. When both sets of coils are connected a position of the receiver midway between the coils 42 and 48, corresponds to the vertical positions through the coils 15 and 45 of the transmitters. This will be understood more clearly from a more detailed consideration of the magnetic fluxes acting.

If the rotor 14 of the unit 11 is in the position with the north-south line of polarization of the rotor 14 deflected to the clockwise position shown in Fig. 3, with the pointer 51' in the position shown, unidirectional fluxes 57 and 58 will react with the fundamental alternating current fluxes in the saturable stator core 13 to produce second harmonic components of current in the coils 15 and 17 which are caused to flow through the corresponding receiver coils 42 and 44. Owing to the saturability of the receiver core 33', the second harmonic fluxes induced therein and superimposed upon the fundamental alternating current flux produce in effect direct current leakage fluxes 59 and 60. These may be combined as the diametrical line of polarization represented by dotted diagonal lines $N_1S_1$. In a similar manner with the rotor of the second transmitter 40 deflected counter-clockwise from its arbitrarily assumed zero position and with its pointer 53' in the position shown as an extension of the rotor line of polarization, leakage fluxes exist which may be combined as a line of polarization $N_2S_2$ in the receiver 41.

Assuming that the transmitter 40 is now connected and the transmitter 11 has its windings disconnected, the line of polarization $N_2S_2$ is displaced counter-clockwise from a line through the winding 48 which corresponds to the transmitter winding 45 of the transmitter 40, since the line of polarization of the transmitter 40 is displaced counterclockwise from the vertical line through the coil 45 when the transmitter rotor is in the position shown. If it is assumed now that the windings of both the transmitters are connected to the current source 22, it will be apparent that the unidirectional leakage fluxes 61 and 62 which produce the line of polarization $N_2S_2$ will combine with the fluxes 59 and 60 to form a line of polarization which is the resultant of $N_1S_1$ and $N_2S_2$ and is represented in Fig. 3 by the oblique arrow 70 passing through the arbitrary zero point 56 of the receiver scale 55. It will be understood that the resultant line of polarization 70 is oblique for the reason that the receiver coils corresponding to the receiver 40 have been misplaced from those corresponding to the receiver 11.

Considering the zero point 56 of the receiver scale 55 as the point of reference, it will be apparent that the position of the pointer 55' is the average position of the pointers 51' and 53' of the transmitters 11 and 40, respectively. The pointer 51' is shown as deflected approximately 60 degrees clockwise from its zero position and the pointer 53' is shown as deflected approximately 60 degrees counterclockwise from its zero position. The average position of course is the zero position indicated by the pointer 55' of the receiver. It will be understood that the permanent magnet rotor 71 of the receiver 41 takes up an angular position with its line of polarization NS along the line 70 which is the resultant of the polarization produced by the reactions in the windings. The position of the pointer 55' will represent the average angular value of the positions of the transmitter pointers 51' and 53'.

The apparatus of Fig. 3 has been referred to as an average position indicator. It may also be thought of as a totalizer or a differential indicator. If both transmitter rotors 14 and 70 are deflected in the same direction, the deflection of the receiver rotor 71 is proportional to the sum of the transmitter rotor deflections. If the connections to one of the transmitters are reversed as by means of a reversing switch 72, the deflection of the receiver rotor is proportional to the difference between the transmitter deflections. With the switch 72 in the original position, as shown in Fig. 3, deflection of the transmitter rotors in opposite directions will result in a deflection of the receiver rotor 71, proportional to the arithmetic difference (or the algebraic sum) of the transmitter deflections. The latter operation may be referred to as algebraic totalization. Thus in their broad sense the terms "totalization" and "totalizer" apply to all of the foregoing ways of utilizing the apparatus of Fig. 3 and I use these terms in the description and claims in the inclusive sense to cover such apparatus however used and not in any restricted sense limited to actual arithmetic addition of two or more values.

In the foregoing explanation the elements 11 and 40 have been referred to as transmitters and the element 41 has been referred to as a receiver; thus, assuming that the movable member or rotor of the element 41 is left free to rotate and the movable members of the rotor 11 and 40 are driven. However, my invention is not limited to this specific arrangement. For example, the unit 40 instead of being a separate transmitter may be merely an adjusting device having a fixed adjustable position of its rotor 75. Such an arrangement may be utilized, for example, when it is desired to adjust the zero position of the receiver 41 without physically moving the scale or some other part of the apparatus, and without making any such changes in the transmitter 11. This may be particularly valuable in the case where adjustments are to be made by an operator at a position inaccessible to the positions of either the transmitter 11 or of the receiver 41 in which case the unit 40, in this case an adjusting unit, will be mounted at such a third position.

Furthermore, although the units 11 and 40 have been referred to as the transmitter and the unit 41 has been referred to as a receiver, my invention is not limited to making the unit 41, the one which is free to rotate, allowing for due consideration to constructing the units with adequate electrical power ratings. For example, the unit 41 may be driven and one of the other units, such as the unit 40, may be left free to rotate. Then with the connections and arrangement originally described with the change-over switch 72 in the normal downward position as illustrated, the deflection of the pointer 53' will represent the resultant of the deflection of the pointers 55' and 51'.

Although in Fig. 3 I have shown two transmitters and one receiver, it will be understood that my invention is not limited to using only two transmitters as any desired number of transmitters and corresponding sets of coils on the receiver may be employed.

In connection with Fig. 2 I described an arrangement in which movable members in a transmitter and a receiver may be caused to follow one another according to which one is driven but with different angular speeds of rotation. For example, as illustrated in the arrangement of Fig. 2 the rotor 39 will rotate at half the angular speed of the rotor 18. The arrangement of Fig. 3 may also be used for reducing the angular speed of rotation of a remote indicator. For example, if the unit 11 in Fig. 3 is held fixed and the unit 40 is rotated, the receiver pointer 55' will rotate at half the angular speed of the transmitter pointer 53'.

When the arrangement of Fig. 3 is used, in what, for convenience, shall be referred to as the normal manner with the units 11 and 40 driven and the unit 41 free to rotate, the principle employed in Fig. 2 may also be employed to obtain a further reduction in the speed of rotation of the receiver 41. For example, if the receiver 41 is modified as shown in Fig. 4, designated 41', so as to have a rotor with four poles instead of two, so as to correspond to the rotor 39 of Fig. 2, the angular speed of rotation of the rotor 71' will be one-half of what it would otherwise be. If two transmitters are employed, one held in a fixed position and the other rotated, the rotor 71' will rotate at one-fourth the angular speed of the rotor of the driven transmitter. Although in Fig. 3 I have shown the exciting windings displaced for clarity, in Fig. 4 I have shown the pairs of windings of the receiver 41' which are connected to corresponding windings of the transmitters closer together so as to be virtually superimposed. This is done in order to obtain better advantage of the doubling of the number of poles 71' since the angular spacing is cut in half by the doubling of the number of poles. As explained in connection with Fig. 2, the reduction in speed of the four-pole rotor 71' results from the fact that the unidirectional magnetization of the portion of the core under a particular winding is reversed twice as often by a complete rotation of a four-pole rotor as by a two-pole rotor. The windings should therefore be concentrated so as not to extend beyond the arcuate spacing between rotor poles of opposite polarity, in this case 90 degrees.

Although in Fig. 4 I have indicated the substitution of a four-pole rotor for a two-pole rotor in the receiver, my invention is not limited to this particular arrangement and variations in the number of poles may be made in the transmitters instead of in the receiver or in both. The change in ratio of angular movements of the various rotors as compared with the arrangement shown in Fig. 3 resulting from changing the number of rotor poles in the several different possible combinations is shown by way of example in the following table:

| Numbers of poles in the rotor | | | Comparative ratios of deflection of transmitter to receiver | |
|---|---|---|---|---|
| Transm. #1 | Receiver | Transm. #2 | Transm. #1 | Transm. #2 |
| 2 | 4 | 2 | 2:1 | 2:1 |
| 4 | 2 | 2 | 1:2 | 1:1 |
| 2 | 4 | 4 | 2:1 | 1:1 |
| 4 | 2 | 4 | 1:2 | 1:2 |
| 4 | 4 | 4 | 1:1 | 1:1 |

It will be understood that still other combinations may be provided and still other ratios will be obtained in case more than two transmitters are employed or in case the unit 41 is made a transmitter and one of the units corresponding to units 11 and 40 is made a receiver.

Although in Fig. 3 I have shown a totalizing system in which the receiver 41 has a plurality of separate windings each of which is the counterpart of a winding on a transmitter and is separately connected in series therewith, it will be understood that my invention is not limited to this arrangement but embraces any arrangement in which the magnetic effects or the electrical effects of two or more transmitters are combined in a receiver by the employment of the principles described in my application.

Action of the type described in connection with Fig. 3 may be obtained by various methods of injection of second harmonic currents or fluxes in windings or a core excited at a fundamental frequency to produce unidirectional resultant fluxes acting upon a magnetic rotor or a magnetic element which is relatively movable with respect to an element carrying the windings and core. For example, as illustrated in Fig. 5 a slightly modified form of receiver 76 is employed which may in fact be a unit which is identical in construction with the transmitter units 11 and 40. In this case all of the corresponding coils are connected in series to the supply source 22. The receiver 76 is provided with coils 77, 78 and 79 which correspond to coils 15, 16 and 17 or coils 45, 46 and 47, respectively. Corresponding coils are connected in series, for example, coils 15, 77 and 45 are connected in series to the source 22.

As explained in connection with Fig. 3 the rotation of the rotors of the transmitters 11 and 40 produces rotation of the lines of polarization $N_1S_1$ and $N_2S_2$ which may be combined into a single resultant line of polarization 70 which determines the angular position of the receiver rotor 71. In this case any one of the units 11, 71 or 40 may be left free to move and will take up an angular position which is the average of the angular positions of the other units, and by appropriate marking of the scale whichever one of the units is considered the receiver will totalize the angular indications of the other units. Where there are three units the unit which is left free to rotate will rotate at one-half the speed of whichever transmitter unit is rotated assuming the other transmitter units are fixed in position. However, if there are more than three units in all, with all but two fixed in position, one of the remaining two driven and the other of the remaining left free to rotate, the rotor which is free to rotate will rotate at a speed which is a fraction of the speed of the driven unit. This fraction is $$\frac{1}{N-1}$$

where N is the total number of units and N−1 is the number of units which may be called transmitter units, the remaining unit being called the receiver unit.

My invention embraces also that totalizing of indications received from both direct current and alternating current transmitters. For example, as illustrated in Fig. 6 there may be an alternating current transmitter 11 such as shown in the figures previously described and a direct current transmitter 80 such as shown in Patent No. 2,248,616, Faus. There may be a receiver 81 which is similar in principle of operation to the receiver previously described. It has a saturable ring-shaped stator core 33' with a rotatable permanent magnet 71, and the stator 33' carries windings such as previously described. There are alternating current excitation and second harmonic transfer windings 42, 43 and 44 corresponding to the windings 19, 20 and 21, respectively, in Fig. 1 or the windings 42, 43 and 44, respectively, in Fig. 3. In addition, there are direct current field windings 82, 83 and 84 connected in the manner described in the aforesaid Faus patent to the transmitter 80. Each of the alternating current windings 42, 43 and 44 is connected in series with one of the transmitter windings 15, 16 and 17 across the alternating current supply terminals 22.

Separate direct current supply terminals 85 are provided which are connected to a pair of brushes 86 and 86' carried by a rotatable member so as to slide along a ring-shaped potentiometer or resistor 87 making contact with diametrically opposite points thereon. The transmitter potentiometer 87 has a plurality of taps, preferably evenly spaced, in this case three taps 88, 89 and 90 connected to corresponding points 91, 92 and 93 of the direct current field winding of the receiver 81. As shown, the direct current receiver field coils 42, 43 and 44 are connected in series and the points 91, 92 and 93 are junction terminals, but of course my invention is not limited to the series connection of the direct current receiver field coils instead of what might be called a Y-connection in which each of the direct current receiver coils will be connected between a mid point and one of the input terminals 91, 92 or 93.

As explained in connection with the figures previously described, the action of my alternating current telemetering system is such that the unidirectional polarization of the transmitter rotor 14 is reproduced in the receiver and the receiver rotor 71 tends to take up a position with its line of polarization in alignment with the line of polarization of the transmitter rotor if the corresponding transmitter and receiver coils are in the same angular position.

As shown in Faus Patent No. 2,248,616 the direct current type of telemetering system shown therein causes diametrical polarization of the receiver core with the line of polarization parallel to the line joining the brushes 86 and 86'. Thus it appears that although the transmitter 80 transfers second harmonic currents, these have the effect of direct current in that they produce a unidirectional polarization of the receiver core 33'. Consequently the receiver rotor 71 takes up an angular position which is the resultant of the angular position of the transmitter rotor 14 and the rotatable transmitter brushes 86 and 86'. According to the numerical markings on the receiver the scale 55, the A. C.-D. C. receiver 81 in Fig. 6 will indicate the average value or the algebraic sum of the angular indications of the transmitters 11 and 80.

In this case also the ratios between the speeds of the transmitter and receiver may be changed by changing the number of poles on the rotors. In various combinations listed by way of example the following changes in speed ratio may be obtained as compared with the results obtained with the arrangement actually illustrated in Fig. 6, assuming two brushes and one set of three connections to the receiver unit 80.

*Ratio deflections of transmitters to the receiver*

| Nos. of poles | | D. C. transmitter | A. C. transmitter |
|---|---|---|---|
| Receiver | A. C. transmitter | | |
| 2 | 4 | 1:1 | 1:2 |
| 4 | 2 | 2:1 | 2:1 |
| 4 | 4 | 2:1 | 1:1 |

Instead of using two different alternating current transmitters as previously described, I may if desired use a single alternating current transmitter 94 with two independently movable, in this case rotatable, permanent magnet rotors 95 and 96 (Fig. 7). The unidirectional magnetic flux acting upon the transmitter core 13 is the flux 97 which is the resultant of the lines of polarization of the magnets 95 and 96. This resultant produces the effect described in connection with Fig. 1 on the core 13 and the windings 15, 16 and 17. The rotor of the receiver 12 follows the angular position of the resultant line of polarization 97 in the same manner as the receiver rotor follows the transmitter rotor 14 in the arrangement of Fig. 1.

Different ratios between the angular speeds of the various rotatable elements may be obtained in this case also by changing the number of poles on one or more of the magnets 95, 96 and 18. The changes in ratio obtained will be the same as described in connection with Fig. 4.

My invention is not limited to the use of rotatable units. For example, as illustrated in Fig. 8, one or more of the transmitter or receiver units may be replaced by a rectilinear unit. In Fig. 8, I have shown a system like Fig. 5 in electrical connections, having the rotatable units 11 and 40 of Fig. 5 replaced by rectilinear units 11' and 40'. Longitudinal movement of the straight magnets 14' and 75' in Fig. 8 corresponds to angular movement of the rotors 14 and 75, respectively, in Fig. 5. The rectilinear units 11' and 40' are of the type represented by reference numerals 80' and 81' and described more in detail in connection with Figs. 13 and 14 of my aforesaid parent application.

In the figures previously described the exciting windings have been described as divided into three parts by forming separate coils or by connecting taps 120 degrees apart, but it will be understood that my invention is not limited to dividing the windings in this manner nor is it limited to utilizing the same windings as exciting windings and transfer windings. For example, as shown in Fig. 9, I may employ windings and connections analogous to those shown in Fig. 24 of my aforesaid parent applications. In this case the transmitter 11 has a pair of exciting windings 105 and 106 connected aiding, with regard to peripheral magnetization, 180 degrees apart on the core 13 electrically connected in series to the supply source 22. There is a second pair of exciting coils 107 and 108 displaced 90 degrees from the first set of coils and also connected aiding in series across the supply terminals 22. The second transmitter 40 is provided with corresponding windings.

The receiver 41 has a shunt type of separate excitation winding 99 connected across the supply terminals 22. For transfer of the resultant second harmonic effects from the transmitters 11 and 40 to the receiver 41, two pairs of transfer windings are provided on the saturable core of the receiver 41. There is a pair of windings 109 and 110 connected in bucking opposition in series between second harmonic transfer points 111 and 112 of the transmitters 11 and 40, respectively. The coils 109 and 110 are arranged 180 degrees apart corresponding to the arrangement of coils of the transmitters. It will be observed that the second harmonic transfer point 111 is the junction terminal of the coils 105 and 106 and the second harmonic transfer point 112 is the junction terminal of corresponding coils on the transmitter 40. The receiver 41 has second harmonic transfer coils 113 and 114, 180 degrees apart and displaced 90 degrees from the coils 109 and 110 also connected in bucking opposition between a second pair of second harmonic transfer points, viz: 115 and 116. The point 115 is the junction terminal of the transmitter coils 107 and 108 and the point 116 is the junction terminal of corresponding coils on the transmitter 40.

Inasmuch as the coils 105 and 106 act aiding with respect to the circuit through the supply terminals 22 and a peripheral magnetic circuit, but are arranged at opposite ends of a diameter of the core 13, they are in opposition with respect to diametrical flux and an electrical circuit which includes them in parallel. The unidirectional magnetization of the permanent magnet rotor 14 will give rise to second harmonic voltages and currents in the coils 105 and 106 which are opposite at opposite ends of the diameter, but act aiding with respect to the parallel circuits formed by the connections through the receiver coils 109 and 110. A like effect takes place with respect to the parallel circuits formed by the connections through the receiver coils 113 and 114. Accordingly the positions of the transmitter rotors produce second harmonic effects which are in turn converted into diametrical lines of polarization in the receiver 41, the resultant of which determines the position of the receiver rotor 71.

An example of complete separation of the exciting and second harmonic transfer windings in the transmitters as well as the receiver analogous to Fig. 23 of my aforesaid parent applications is shown in Fig. 10 of the present application. In this case there are transmitter exciting windings 98 and 101 for transmitters 11 and 40, respectively, which may be connected in series or parallel as desired across the supply terminals 22. The receiver 41 is also provided with an exciting winding 99 which may be connected in series or parallel with the excitation windings 98 and 101. Second harmonic pick-up and transfer windings are provided consisting of pairs of coils in bucking opposition on each of the cores and corresponding pairs of such coils may be connected in series. For example coils 105 and 106 of the transmitter 11 are connected in series in bucking opposition with coils 113 and 114 of the receiver 41 and coils 117 and 118 of the transmitter 40. The coils 113 and 114 are in bucking opposition at points 180 degrees apart on the core of the receiver 41 and the coils 117 and 118 are in bucking opposition 180 degrees apart on the core of the transmitter 40. Likewise there are pick-up and transfer coils displaced 90 degrees from those just mentioned, viz: 107 and 108 on the core of the transmitter 11, 109 and 110 on the core of the receiver 41, 119 and 120 on the core of the transmitter 40. These coils are also connected in series, a pair of coils on each core being in bucking opposition. Since the coils are in bucking opposition they do not transfer fundamental frequency alternating currents, but the second and other even harmonics act cumulatively therein to transfer the second harmonic and magnetic field effects from the transmitters to the receiver to produce totalization in the manner previously described for Fig. 5.

Although I have referred in each case to a transmitter having a movable magnet for producing unidirectional polarization of the core, it will be understood that my totalizing system is adaptable also to devices such as magnetic compasses and magnetic field direction indicators, in which transmitters are placed at different points to average out opposite field distortions. Then the movable magnets may be omitted from the transmitters. A compass adjusting system may also be formed. For example, the magnet may be omitted from the transmitter 11 (as illustrated in Fig. 10) and its core 13 may be so mounted that it is responsive to the direction of the earth's magnetic field. In this case the transmitter 40 may be used merely for scale adjustment and its rotor may be held in a fixed position when the desired adjustment has been obtained. It will be apparent that the earth's magnetic field in the direction SN represented by the arrows 121 will have the same effect on the stator core 13 as the line of polarization NS represented by the arrow 122. Accordingly as the core 13 is changed in orientation with respect to the earth's magnetic field, an effect will be transferred to the field 41 which will cause its rotor 71 to rotate in dependence upon changes of orientation. A navigator may make suitable corrections such as for changes in the magnetic declination at different longitudes by adjustment of the angular position of the permanent magnet rotor of the unit 40.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States, is:

1. An alternating current indication totalizing system comprising in combination a plurality of transmitters of the alternating-current-excited second-harmonic-generating type each having only a single set of windings which serve both as exciting and signal current transmitting windings, output connections for said windings, a pair of excitation terminals for connection to a source of alternating current, and a receiver comprising a stator core composed of saturable magnetic material, a movable magnet in inductive relation thereto, and a single set of windings linking said core which serve both as exciting and signal current receiving windings, each of said receiver windings being connected to said alternating current input terminals in series with a winding of one of the transmitters for combining transmitter effects in said receiver and producing angular deflection of the magnet thereof proportional to the algebraic sum of the indications to be transmitted by the transmitters but having a value which is a fraction thereof.

2. An alternating current indication totalizing system comprising a plurality of transmitters each having a stator element comprising an annular saturable magnetic core and a single set of windings thereon which serve both as exciting and signal current transmitting windings, polarized rotors for said transmitters, a receiver having a stator comprising an annular saturable magnetic core and a winding thereon which serves simultaneously both for excitation and signal current receiving purposes, a polarized rotor for the receiver, a common source of alternating current and connections thereto for energizing all of the windings on transmitters and receiver from said source and additional connections between the transmitters and receiver for completing with said energizing connections signal current channels between the windings on the transmitters and receiver, said receiver producing an angular indication corresponding to the algebraic sum of the angular indication of the transmitters.

HENDRIK D. MIDDEL.